Patented Nov. 14, 1950

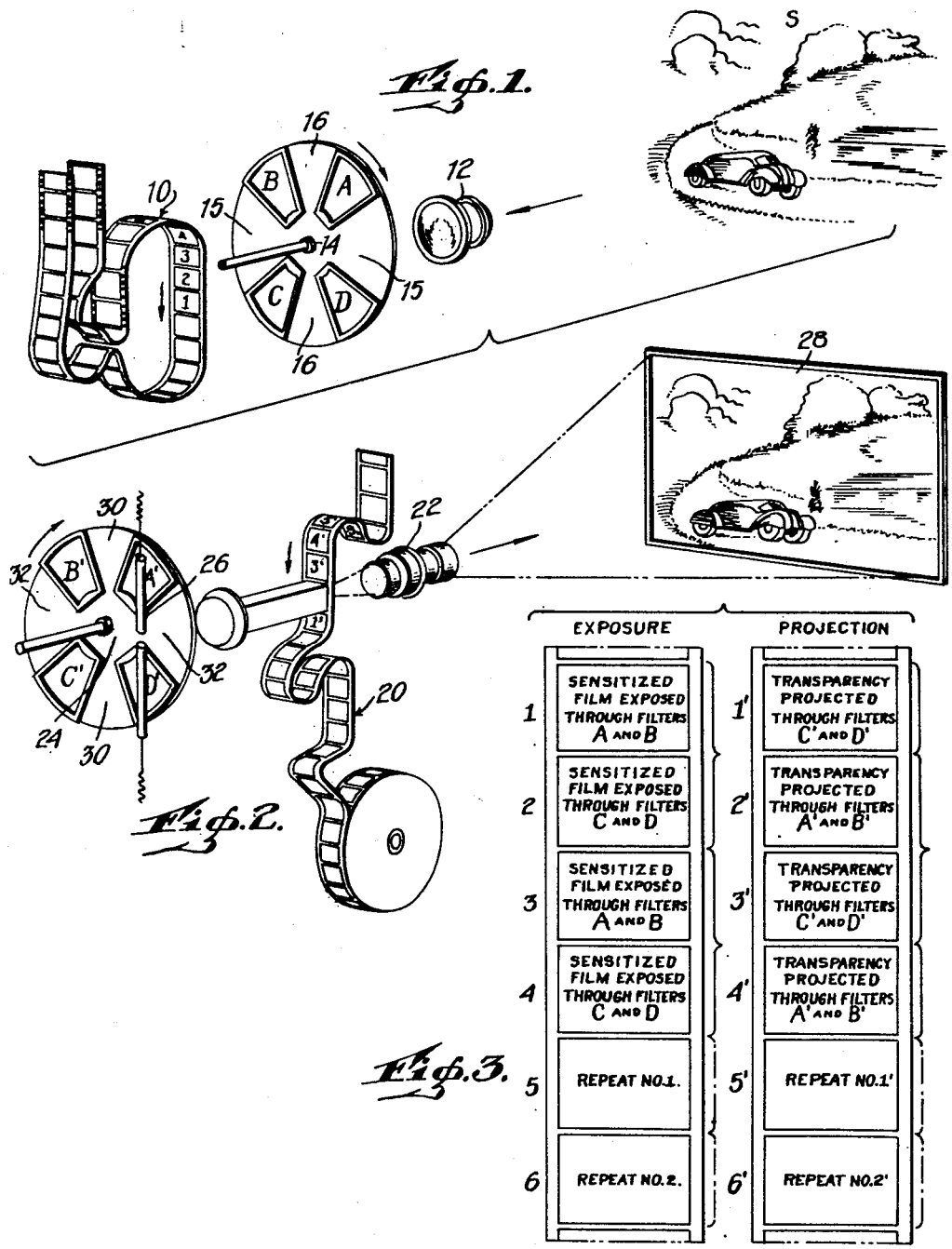

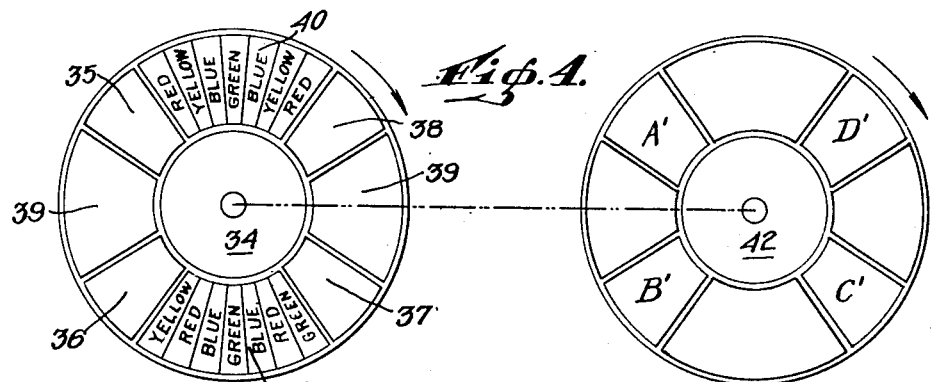
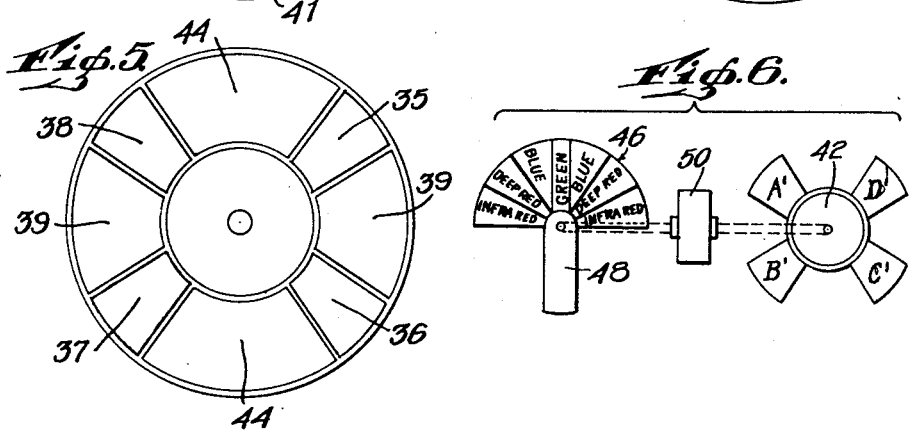
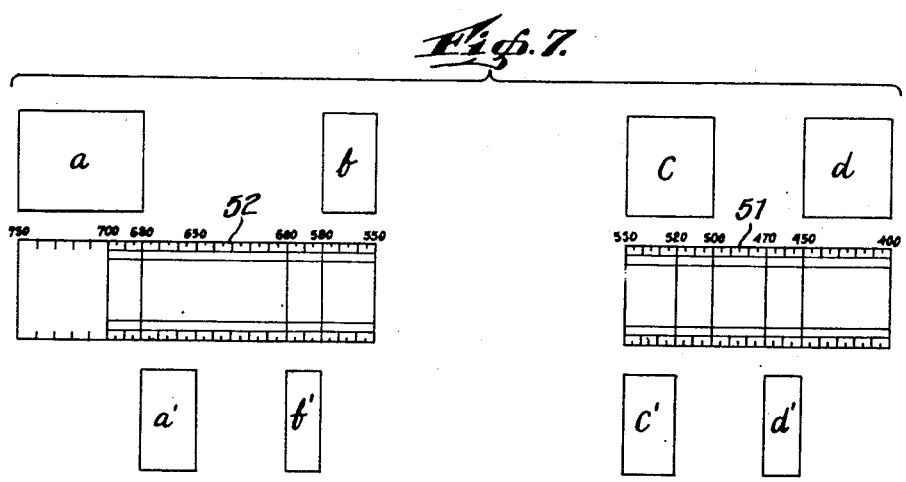

2,530,023

UNITED STATES PATENT OFFICE 2,530,023

COLOR CINEMATOGRAPHY

Warren Millais, New York, N. Y., assignor to Walter A. Amend, Sr., Great Bend, Kans.

Application June 13, 1944, Serial No. 540,053

19 Claims. (Cl. 88—16.4)

The present invention relates to cinematography and more particularly to the art of taking and projecting moving pictures in natural colors although certain features of the invention may be advantageously employed in black and white as well as in colored cinematography.

The method and apparatus of the present invention relate to the type of motion picture photography and projection wherein a moving scene is recorded on a sensitive film in black and white images, the film is developed and a transparent positive printed therefrom for projection of the images on to a screen; color filters being employed both in the taking and in the projection and reliance placed on persistence of vision for production of the desired color sensation in the viewing.

The present invention provides an improved system of the above general type by elimination of color fringes, lessening or elimination of color bombardment, and by obtaining more faithful color reproduction. The system of the present invention requires no radical rebuilding of equipment as it may be added to existing cameras and projectors at relatively small cost, nor does it require any unusual degree of skill either in photographing or in projecting.

Other advantages of the invention will become apparent as the description proceeds.

Of the drawings—

Fig. 1 is a schematic view illustrating the method in which exposures of a sensitive film are made in accordance with the invention;

Fig. 2 is a similar schematic view illustrating projection in accordance with the invention;

Fig. 3 is a diagrammatic view showing a strip of exposure film and a strip of projection film with the frames of each labeled to indicate the steps employed in exposure and projection;

Fig. 4 is an enlarged face view of a pull down and flicker blade assembly and of a filter assembly used in projection in accordance with the one embodiment of the invention;

Fig. 5 is a view of the reverse side of the pull down and flicker blade assembly of Fig. 4;

Fig. 6 is a view similar to Fig. 4 but showing a modified form of pull down and flicker blade assembly for use in projectors of smaller size; and Fig. 7 is a diagram explanatory of the color filters employed in a specific embodiment of the invention.

In Fig. 1 a high speed motion picture photographic process is illustrated with a scene S being photographed on to a strip of sensitive motion picture film 10. Interposed between the film 10 and the usual lens assembly 12 of the camera is a rotary filter holder 14 carrying a plurality of filters, in the particular embodiment illustrated four filters A, B, C and D separated by opaque sectors 15 and 16. It will be understood that film 10, of which for convenience in explanation some of the frames are numbered consecutively with the reference numerals 1 to 6, is moved in the direction of the arrow with the usual step-by-step mechanism to successively present each frame for exposure. In accordance with the invention, each filter A, B, C and D permits the passage of part only of the light rays issuing from the scene S, each filter blocking the passage of light of wave lengths predominantly within a monochromatic range of the visible spectrum such as red, orange-yellow, etc., and the rate of rotation of the filter holder 14 is such that each frame of the film 10 is successively exposed to light transmitted through two of the filters. More specifically and with reference to the momentary positions of the film and filter holder illustrated in Fig. 1, frame 1 of film 10 has just been successively exposed to light passing through filters A and B and the film has been moved downwardly during the passage of the opaque sector 15 past the light beam to bring frame 2 into alinement with the lens assembly. Frame 2 is now successively exposed to light passing through filters C and D. The film will thereafter move during passage of the other opaque sector 15 past the light ray to bring frame 3 into line for successive exposure through filters A and B. Thus frames 1, 3, 5, etc., are similarly exposed through filters A and B while frames 2, 4, 6, etc., are exposed through filters C and D. The filters A, B, C and D in accordance with the invention each pass light of a relatively wide range of wave lengths, there being preferably a considerable overlap of the range of wave lengths passed by the filters as will be discussed hereinafter in connection with the diagram of Fig. 7 representing one specific selection of filter wave lengths. In general, the filters A, B, C and D block or absorb wavelengths in a particular color region of the spectrum while passing the remainder of the spectrum, as for instance filter A may block wavelengths in the red region and pass light in the remainder of the spectrum. Similarly, filters B, C and D may block wavelengths in the yellow or orange region, green region and blue region, respectively. The optimum selection of wave lengths ranges to be passed by the filters depends to some extent upon the type of sensitive film employed in the process, that is, whether the film is more sensitive to light of certain wave lengths or is uniformly sensitive to all wave lengths, of the visible spectrum. I have found, however, that irrespective of the particular type of sensitive film employed, superior results are obtained when the filters used in taking, as above indicated, pass relatively wide ranges of wave lengths with substantial overlapping of the particular ranges as between the several filters. The filters used in projection, however, should differ from those used in the taking and preferably should pass but relatively narrow ranges of wave lengths, each being in general complementary, or nearly so, to the range passed by one of the filters used in taking. This will be further discussed hereinafter in connection with Fig. 7.

The sensitive film 10, after exposure as above described, is developed and a transparent positive print made therefrom. This positive print is then used for projection as indicated in Fig. 2, to which reference may now be had. The transparent positive film 20 having images thereon corresponding to those developed upon the sensitive film 10 of Fig. 1 is positioned between a lens system 22 and a rotary filter holder 24 which, in the embodiment illustrated, carries four filters A', B', C' and D' for successive filtering of light from any suitable source, as, for example, an electric arc indicated diagrammatically at 26. Images on the transparent print 20 are projected on the screen 28. As in Fig. 1, the positive print is moved intermittently to bring each frame thereof into registry with the lens system and the light from the source 26 and the filter holder is rotated so as to illuminate each frame successively with light passing through two of the four filters. Specifically, as indicated in Fig. 3, those frames 1', 3', 5' of the film 20 which correspond to frames 1, 3, 5 of the sensitive film 10 which were exposed through filters A and B are illuminated by light passing through projection filters C' and D', while the alternate frames of the positive film 20, corresponding to those of the sensitive film exposed through filters C and D, are illuminated by light passing through projection filters A' and B'.

The projection filters A', B', C' and D' differ from the filters A, B, C and D in that each of the latter absorbs a range of wavelengths in one color region of the spectrum while passing the remainder thereof while the projection filters each pass only one color range of wavelength and blocks the remainder of the visible spectrum.

I have found, however, particularly when using panchromatic film in the camera, most satisfactory and faithful color reproduction may be obtained when the filters of some at least of the pairs are not "complementary" in the strict technical sense in that the filters of the pair together do not pass all wave lengths of the entire visible spectrum or in that some wave lengths are passed by both filters of the pair. By "substantially complementary" as used herein and in the appended claims, I therefore intend to include some such variations from the strict technical meaning of the term "complementary."

During projection, as illustrated in Fig. 2, the sectors 30 between the filters A' and B' and between the filters C' and D' are interposed between the light sources and the film 20 by rotation of the filter holder 24 and during movement of the film to bring the next frame into registry, sectors 32 between filters B' and C' and between filters D' and A' are interposed between the light source and the film. Sectors 30 and 32 correspond to, and may be, the usual opaque metal flicker and pull down blades respectively of the projector.

I have found, however, that there is less eyestrain and fatigue if pull down and flicker blades are employed which pass some light to the screen. The complete absence of light on the screen 28 during the interval when the usual opaque flicker and pull down blades block the light, although not detected by the observer, is believed to be a shock to the optic nerve and the cause of eye strain and fatigue, particularly when the preceding and succeeding images are in colors. In accordance with the invention new pull down and flicker blades are employed in projection which pass some light. In Figs. 4 and 5 is shown a pull down and flicker blade assembly representing a preferred arrangement for use in the ordinary 35 mm. projector in combination with the filters A', B', C' and D', and in Fig. 6 is shown a pull down and flicker blade arrangement suitable for use in a 16 mm. projector in combination with the filters A', B', C' and D'.

The new pull down and flicker blade assembly shown in Figs. 4 and 5 comprises a holder 34 having openings 35, 36, 37 and 38 for registration respectively with the filters A', B', C' and D'. Between the openings 35 and 36 and between the openings 37 and 38 are flicker blades 39 which are not opaque but are filters permitting the transmission of violet light rays only to the screen. These blades preferably transmit light having wave lengths in the range 400 to 430 m$\mu$. The violet light momentarily allowed on the screen by the flicker blades 39 between the red and yellow lights transmitted respectively through filters A' and B' and between the green and blue lights transmitted respectively through the filters C' and D' softens and blends the coloring of the images and substantially reduces eye strain.

The new pull down blades 40 and 41 positioned between the openings 38 and 35 and the openings 36 and 37 respectively also serve to render easy to the eye the transition between the colors played on the screen through the filters D' and A' and B' and C' by carrying a continuation of color on the screen. Each pull down, as indicated in Fig. 4, includes a plurality of filter elements each allowing passage of light of the color indicated in the drawing. As shown, pull downs 40 and 41 each preferably include seven filter elements. The filter elements of each pull down are arranged somewhat in the natural sequence of the spectrum and with relation to the colors passed by the adjacent projection filters. Thus as the filter holder 42 for the projection filters and the pull down and flicker blade holder 34 rotate together in the direction of the arrows, the sequence of colors passed by pull down blade 41 following the yellow image on the screen due to the light through filters B' and preceding the green image due to the light through filter C' is yellow-red-blue-green-blue-red-green, while the sequence of colors of pull down 40 for the transition from the blue to the red images caused by filter D' and A' is red-yellow-blue-green-blue-yellow-red. The pull down blades thus carry a continuation of color on the screen and prevent the color coming through the following projection filter from being a glaring color to the optic nerve. As substantially all the colors of the spectrum are carried by the filter elements of the pull downs and as each element passes rapidly by the aperture, no one color is apparent to the eye but rather a smooth blending of the colors passed by the adjacent projection filters. It is during the passage of the pull down blades through the light beam that the movement of the positive film occurs to present a different frame for projection. In order that movement of the frames of the film will not be detectable on the screen, the intensity of the light passing through the pull down filter elements is reduced by the provision of semi-opaque shields 44 which are carried by the holder 34 and cover the surface of the pull down blades facing the screen. These shields 44 are shown in Fig. 5.

It will be understood that the pull down and flicker blade assembly of Figs. 4 and 5 are intended to be driven synchronously with the filter holder 42 about a common axis, as indicated by the dashed line of Fig. 4 and that the projection filters A', B', C' and D' will be positioned substantially in the respective openings 35, 36, 37 and 38 so as to form an assembled unit suitable for use in the projection system of Fig. 2.

In Fig. 6 is illustrated an alternative form of pull down and flicker blade assembly particularly suitable for use in 16 mm. projectors. In such small projectors it is convenient to provide but one pull down blade and one flicker blade and to double the rate of rotation thereof relative to that of the filter holder 42. The single pull down 46 of Fig. 6 is composed of a plurality of filter elements each passing light of the color indicated, namely, reading from left to right, infra red-red-blue-green-blue-red-infra red and the single flicker blade 48, like the flicker blades 39 of Figs. 4 and 5, passes violet light only. By rotation of the pull down and flicker blades assembly at a rate twice that of the filter holder 42, as by a multiplication gear indicated diagrammatically at 50, the single pull down 46 of Fig. 6 serves the purpose of the two pull down blades 40 and 41 of Fig. 4 and the single flicker blade 48 serves the purpose of the two flicker blades 39 of Fig. 4. The filter elements of the blade 46 permit the passage of light of the indicated colors to the screen during movement of the film and the flicker blade 48 permits the passage of violet light between successive color images of the same frame. Pull down 46, like pull downs 40 and 41, is backed by a suitable semi-opaque shield (not shown) for reduction of the light intensity playing on the screen during movement of the frames of the film.

In practicing the invention as above described with reference to the drawings and using standard panchromatic motion picture film for the sensitive film in the camera exceptionally true color reproduction is obtained, with substantially no color bombardment and no color fringes, when the particular taking and projection filters now to be described are employed.

In Fig. 7 the scale of wave lengths of the visible spectrum from blue through most of the green is indicated at 51 and the rest of the scale of visible wave lengths and including some of the infra red scale is indicated at 52. Characteristics of the filters A, B, C and D used in the camera are represented above the scale in Fig. 7 and characteristics of the projection filters A', B', C' and D' are represented below the scale. The area $a$ above the scale section 52 and extending through the range 680 to 750 m$\mu$ indicates that the filter A used in the camera blocks that range of wave lengths in the spectrum and transmits light of all other wave lengths. The section $a'$ below the scale section 52 and extending through the range 650 to 680 m$\mu$ indicates that the projection filter A' transmits light of wave lengths within that range. As the red range of the spectrum extends approximately from 600 to 700 m$\mu$ the filters A and A' could be called substantially complementary in that one, filter A, blocks red light whereas the other, filter A', transmits only red light. In view of the fact, however, as shown in Fig. 7, that the exact part of the red range of wave lengths blocked by filter A as indicated at $a$, differs from the part of the red range of wave lengths passed by filter A', as indicated at $a'$, the pair of filters A and A' in this specific embodiment of the invention are not "complementary" in the strict technical sense. From the above description of the preferred characteristics of filters A and A' by reference to the bands indicated at $a$ and $a'$, the showing of the rest of Fig. 7 will be readily understood. The band $b$ shown above the scale section 52 indicates that the camera filter B will block light having wave lengths within the range 550 to 580 m$\mu$, whereas the projection filter B', as indicated by the band $b'$ below the scale, will pass only light having wave lengths within the range 580 to 600 m$\mu$. Thus the filters of this pair also in this embodiment of the invention, are not strictly complementary. Similarly the bands $c$ and $c'$ indicate that camera filter C will block light having wave lengths within the range 500 to 550 m$\mu$, while projection filter C' will pass wave lengths within the range 520 to 550 m$\mu$. In this case the filters of this pair are more nearly strictly complementary than in the case of either of the pairs A, A' or B, B'. Bands $d$ and $d'$ indicate that the camera filter D will block light having wave lengths between 400 and 450 m$\mu$ and projection filter D' will pass only wavelengths in the range 450 to 470 m$\mu$. This pair also, therefore, are not strictly complementary.

The filter characteristics above described with reference to Fig. 7 are those found preferable when employing panchromatic film in the camera and when using an arc light in projection, as in the standard 35 mm. projector. When a different type of sensitive film or of projection light is employed, the preferred filter characteristics will depart somewhat from those indicated in Fig. 7, as will be apparent to those skilled in the art. For example, in a 16 mm. projector where an incandescent lamp is ordinarily employed, the range of wave lengths passed by filter A' (the red projection filter) should be somewhat reduced to compensate for the excess of red light given out by the filament, or where a sensitive film is employed that is not sufficiently sensitive to the longer wave lengths corresponding adjustments of the ranges of the taking filters should be made.

The characteristics of the individual filter elements of the new pull down blades may be varied within limits, but projection has been obtained when the filter elements of the pull down blades of Fig. 4 pass the following ranges of wave lengths:

Red element_____ range 690 to 750 m$\mu$
Yellow element_____ range 555 to 590 m$\mu$
Green element_____ range 520 to 550 m$\mu$
Blue element_____ range 430 to 450 m$\mu$ The preferred range of wave lengths passed by the new flicker blades, as heretofore indicated, is from 400 to 430 m$\mu$.

From the foregoing description it will be apparent that the invention comprises a new system of cinematography in colors that involves but few and relatively simple modifications of existing equipment and that results in faithful color reproduction on the screen without eye strain or fatigue due to color bombardment. With the new method and system pure color values without fringes are obtained and both outdoor and indoor scenes may be reproduced equally well. Although all of the new features of the invention are preferably employed together for optimum results, certain of them are useful in themselves. For example, although the new pull down and flicker blades contribute materially to the benefits obtained by the system as a whole, opaque blades could be substituted therefor and the resulting system would still be one in which faithful color reproduction without fringes was obtained. Conversely, although the new pull-down and flicker blades are designed for use in color cinematography and particularly in the system of the present invention, either of them may be advantageously employed in ordinary black and white projection as well as in other systems of color cinematography.

Furthermore, although the playing of different colored lights on to the screen during the pull-down period in the preferred embodiment of the invention has been described with reference to the plurality of filter elements in the pull-down blade positioned between the light source and the film, corresponding filter elements could be successively interposed between a separate light source and the screen (which might be on either side of the screen) to play the colored lights directly upon the screen without passage through the film. In such case the usual opaque pull-down blades could be employed and the filter elements for playing the lights on the screen during the pull-down period would be driven synchronously with the pull-down.

I claim:

1. The method of motion picture photography and projection in colors which comprises exposing one frame of a sensitive film successively through a filter passing substantially all wavelengths in the visible spectrum except a band of red wavelengths and a filter passing substantially all wavelengths of the visible spectrum except a band of yellow wavelengths, then exposing the next frame of the film successively through a filter passing substantially all wavelengths of the visible spectrum except a band of green wavelengths and a filter passing substantially all wavelengths in the visible spectrum except a band of blue wavelengths, then exposing the third frame of the film like the first and the fourth frame like the second and so on for all of the frames of the film, projecting the images of the frames of a positive corresponding to the frames of the sensitive film exposed through the filters blocking red and yellow light, successively through a filter passing only green light and a filter passing only blue light and each other frame successively through a filter passing only red light and a filter passing only yellow light.

2. The method of colored motion picture photography and projection which comprises obtaining a negative film having a series of black and white images thereon by exposing the frames of the film successively through filters each passing light of substantially the greater portion of the wave lengths of the visible spectrum except those wave lengths generally within a monochromatic range thereof and then projecting from a positive print of said negative the images through filters each passing only light of wave lengths within a monochromatic range of the spectrum, the monochromatic ranges excepted by the filters during exposure of the film being from 400 to 450 m$\mu$, from 500 to 550 m$\mu$, from 550 to 580 m$\mu$, and from 680 to 750 m$\mu$, and the monochromatic ranges passed by the filters during projection being from 450 to 470 m$\mu$, from 520 to 550 m$\mu$, from 580 to 600 m$\mu$, and from 650 to 680 m$\mu$, and a series of lights of intensity low enough to prevent the movement of the film from being distinguished being passed to the screen during pull-down, the series of lights including the colors red, yellow, green and blue having wave length ranges specifically of 690 to 750 m$\mu$, 555 to 590 m$\mu$, 520 to 550 m$\mu$, and 430 to 450 m$\mu$, the order of the series of lights during one pull-down period being yellow, red, blue, green, blue, red, green and during the succeeding pull-down period being red, yellow, blue, green, blue, yellow, red.

3. The method of colored motion picture photography and projection which comprises obtaining a negative film having a series of black and white images thereon by exposing the frames of the film successively through filters each passing light of substantially the greater portion of the wave lengths of the visible spectrum except those wave lengths generally within a monochromatic range thereof and then projecting from a positive print of said negative the images through filters each passing only light of wave lengths within a monochromatic range of the spectrum, the monochromatic ranges excepted by the filters during exposure of the film being from 400 to 450 m$\mu$, from 500 to 550 m$\mu$, from 550 to 580 m$\mu$, and from 680 to 750 m$\mu$, and the monochromatic ranges passed by the filters during projection being from 450 to 470 m$\mu$, from 520 to 550 m$\mu$, from 580 to 600 m$\mu$, and from 650 to 680 m$\mu$, and a series of lights of intensity low enough to prevent the movement of the film from being distinguished being passed to the screen during pull-down, the series of lights including the colors red, yellow, green and blue having wave length ranges specifically of 690 to 750 m$\mu$, 555 to 590 m$\mu$, 520 to 550 m$\mu$, and 430 to 450 m$\mu$, the order of the series of lights during one pull-down period being yellow, red, blue, green, blue, red, green and during the succeeding pull-down period being red, yellow, blue, green, blue, yellow, red, and wherein between projection of each frame through the two different filters violet light in the range of wave lengths 400 to 430 is passed to the screen.

4. The method of motion picture photography and projection in colors which comprises exposing one frame of a panchromatic sensitive film successively through a filter blocking light of wave lengths in the range from 680 to 750 m$\mu$ and a filter blocking light of wave lengths in the range from 550 to 580 m$\mu$, then exposing the next frame of the film successively through a filter blocking light of wave lengths in the range from 500 to 550 m$\mu$ and a filter blocking light of wave lengths in the range 400 to 450 m$\mu$, then exposing the third frame like the first and the fourth frame like the second and so on for all of the frames of the film, developing the film, printing a transparent positive therefrom and finally projecting the images on each of the frames of the positive corresponding to the first, third, etc., of the panchromatic film successively through filters passing green and blue light and the images on each of the other frames successively through filters passing red and yellow light.

5. The method of colored motion picture photography and projection according to claim 4 wherein images on the frames of the positive corresponding to the first, third, etc. frames of the panchromatic film are successively projected through a filter passing light having wave lengths in the range from 520 to 550 m$\mu$ and a filter passing light having wave lengths in the range 450 to 470 m$\mu$, and the images on the other frames of the positive are projected successively through a filter passing light of wave lengths in the range from 650 to 680 m$\mu$ and a filter passing light of wave lengths in the range 580 to 600 m$\mu$.

6. In the art of colored motion picture photography, the steps comprising exposing one frame of a sensitive film successively through two filters each passing all wave lengths of light but blocking a different color range of wave lengths of the spectrum, then exposing the next frame of the film successively through two other filters each passing all wave lengths of light but blocking different color ranges of wave length of the spectrum, which ranges are also different from the ranges blocked by the filters for said first frame, then exposing the third frame of the film like the first and the fourth frame like the second and so on for all of the frames of the film, whereby each frame of the film is exposed to some light of all wave lengths of the spectrum issuing from the scene being photographed but with the spectral range of exposure to light differing for adjacent frames.

7. In the art of colored motion picture photography, the steps comprising exposing one frame of a sensitive film successively through filters passing substantially the entire spectrum with one filter blocking wave lengths generally within the range of 550–580 m$\mu$ and another filter blocking wave lengths generally within the range of 680–750 m$\mu$ of the spectrum, then exposing the next frame of the film successively through filters passing substantially the entire spectrum with one filter blocking wave lengths generally within the range of 400–450 m$\mu$ and another filter blocking wave lengths generally within the range of 500–550 m$\mu$, then exposing the third frame of the film like the first, and the fourth frame like the second and so on for all of the frames of the film whereby each frame of the film is exposed to light of the greater portion of the wave lengths of the spectrum issuing from the scene being photographed except in each instance the light blocked by the filters to obtain a negative and then a positive print for projecting the odd numbered frame successively through a pair of filters passing light of wave lengths within different color ranges of the spectrum passed in the exposure of the frame and the even numbered frames successively through a pair of filters passing only light of wave lengths within different color ranges of the spectrum passed in exposure of said even numbered frames and differing from the color ranges of the filters for said odd numbered frames.

8. In the art of colored motion picture projection the steps comprising projecting the frames of the positive print of the film produced according to the method of claim 7 by successively projecting every other frame through filters passing wave lengths within the general range of 580–600 m$\mu$ and the range of 650–680 m$\mu$ and the intermediate frames successively through filters passing wave lengths generally within the range of 450–470 m$\mu$ and the range of 520–550 m$\mu$.

9. The art of motion picture photography and projection which comprises exposing alternate frames of a strip of sensitive film to substantially all wave lengths of light each frame being successively exposed through two filters each substantially blocking a different color range of light and every other frame being exposed through two filters blocking two other and different color ranges of light, developing said sensitive film and printing a positive therefrom, and projecting each positive frame successively through a pair of filters each passing wave lengths substantially within the same range of those absorbed by filters through which the adjacent frame of the sensitive film was exposed.

10. The method of color photography wherein successive frames of a sensitive film are individually exposed to substantially all wave lengths of light reflected from a scene, comprising the steps of filtering the light for exposure of the first frame to successively and substantially block at least part of the red wave lengths and a relatively narrow range of yellow wave lengths, filtering the light for exposure of the second frame to successively and substantially block at least part of the blue wave lengths and a relatively narrow range of yellow-green wave lengths, and repeating the procedure for successive pairs of frames to complete the film.

11. The method of color photography wherein successive frames of a sensitive film are individually exposed to light reflected from a scene, comprising the steps of successively exposing the first frame through a filter passing substantially all wave lengths of light except part of the long visible wave lengths and a filter passing substantially all wave lengths of light except a relatively narrow band of medium wave lengths, successively exposing the second frame through a filter passing substantially all wave lengths of light except part of the short visible wave lengths and a filter passing substantially all visible wave lengths except a relatively narrow band of medium wave lengths, said latter band of medium wave lengths being shorter than and adjacent to said former medium band, and repeating said procedure to complete the film.

12. The method of exposing black and white sensitive film for the production of color pictures, comprising exposing the first frame to substantially all wave lengths of light while successively blocking at least part of the red wave lengths at one end of the visible spectrum and a relatively narrow band of yellow wave lengths, exposing the second frame to substantially all wave lengths of light while successively blocking at least part of the blue-violet wave lengths at the other end of the spectrum and a relatively narrow band of yellow-green wave lengths, exposing the third frame like the first, the fourth like the second and so on to complete the exposure of the film, and developing the exposed film.

13. The method of projecting black and white positive film printed from a developed sensitized film prepared according to the method set forth in claim 12 to reproduce the photographed images in color comprising the projection of light through the first frame and successively filtering it to pass a relatively narrow band of blue and a relatively narrow band of yellow-green, said blue and yellow-green bands being substantially balanced about the center of that portion of the spectrum admitted for exposure of the companion frame on the sensitized film, the projection of light through the second frame and successively filtering it to pass a relatively narrow band of red and a relatively narrow band of orange-yellow, said red and orange-yellow bands being substantially balanced about the center of that portion of the spectrum admitted for exposure of its companion frame of sensitized film, and projecting the third and fourth frames like the first and second to complete the projection of the film.

14. The method of color photography according to claim 10 wherein the several frames are exposed through each of their respective filters for equal periods of time.

15. The combination with a motion picture projector of means for projecting black and white film in color comprising a rotary filter element having red, orange-yellow, yellow-green and blue filter segments of equal angular width disposed uniformly thereabout, said filter being positioned so that its filter segments will successively intercept the light beam, a rotary shutter and flicker assembly concentrically alined with said filter element to intercept the light beam, said shutter being substantially semi-circular and having a plurality of filter elements disposed in a uniform balanced color arrangement and said flicker being substantially rectangular and adapted to pass violet light, and means coupling the rotary filter with the shutter-flicker assembly whereby the latter rotates at twice the speed of the former and is synchronized therewith to cause the shutter to intercept the light beam during the interval between the orange-yellow and yellow-green filters and between the blue and red filters, and the flicker to intercept the beam between the red and orange-yellow filters and between the yellow-green and blue filters, said periods of interception of the light beam by said shutter constituting the pull-down period of said film.

16. In the art of colored motion picture photography, the steps comprising exposing one frame of sensitive film successively through filters each passing substantially the entire spectrum with one filter blocking wavelengths generally within the yellow range and another filter blocking wavelengths generally within the red range of the spectrum, then exposing the next frame of the film successively through filters passing substantially the entire spectrum with one filter blocking the wavelengths generally within the blue-violet range and another filter blocking wavelengths generally within the yellow-green range of the spectrum, then exposing a third frame like the first, a fourth like the second, and so on for all of the frames of the film, whereby each frame of the film is exposed to light of the greater portion of the wavelengths of the spectrum issuing from the scene being photographed, except in each instance the ligh blocked by the filters to obtain a negative and then projecting the odd numbered frames successively through a pair of filters each passing light of wavelengths within a different color range of the spectrum passed in the exposure of the frame and even numbered frames successively through a pair of filters each passing light of wavelengths within a different color range of the spectrum passed in exposure of said even numbered frames and differing from the other color ranges.

17. In the art of colored motion picture reproduction the steps comprising projecting a film having every other frame exposed successively through two filters each passing substantially the entire spectrum with one filter blocking wavelengths generally within the yellow range and the other filter blocking wavelengths generally within the red range of the spectrum, and having the remaining frames of the film each successively exposed through filters each passing substantially the entire spectrum with one filter blocking the wavelengths generally within the blue-violet range and another filter blocking wavelengths generally within the yellow-green range of the spectrum, whereby each frame of the film is exposed to light of the greater portion of the wavelengths of the spectrum issuing from the scene being photographed, except in each instance the light blocked by the filters to obtain a negative, by successively projecting through a pair of filters, one passing light of wavelengths within the yellow-green range and the other passing light within the blue range of the spectrum and projecting the remaining frames successively through two filters, one passing light of wavelengths within the red range and the other passing light within the orange-yellow range.

18. The method of motion picture photography and projection in colors which comprises exposing to visible light one frame of a panchromatic sensitive film successively through a filter blocking red light and a filter blocking orange-yellow light, then exposing the next frame of the film successively through a filter blocking green light and a filter blocking blue-violet light, then exposing the third frame like the first and the fourth frame like the second and so on for all of the frames of the film, and projecting the images on the frames of a positive print corresponding to the first, third, etc., of the panchromatic film successively through a filter passing light having wavelengths in the yellow-green range, and a filter passing light having wavelengths in the blue range, and the images on the other frames of the positive through a filter passing light of wavelengths in the red range and a filter passing light of wavelengths in the orange-yellow range.

19. The method of exposing black and white motion picture film comprising exposing every other frame through two filters, one filter passing light of substantially all visible wavelengths except a band of red wavelengths and the other filter passing light of substantially all visible wavelengths except a band of yellow wavelengths and exposing each remaining frame through two filters, one passing light of substantially all visible wavelengths except a band of yellow-green wavelengths and the other passing light of substantially all visible wavelengths except a band of blue-violet wavelengths.

WARREN MILLAIS.

REFERENCES CITED

The following references are of record in the file of this patent:

UNITED STATES PATENTS

| Number | Name | Date |
|---|---|---|
| 1,130,221 | Van Riper | Mar. 2, 1915 |
| 1,202,724 | Joy | Oct. 24, 1916 |
| 1,245,970 | Richardson | Nov. 6, 1917 |
| 1,278,211 | Raleigh et al. | Sept. 10, 1918 |
| 1,278,302 | Campbell | Sept. 10, 1918 |
| 1,307,984 | Myers et al. | June 24, 1919 |
| 1,349,215 | Lehman | Aug. 10, 1920 |
| 1,427,131 | Stewart et al. | Aug. 29, 1922 |
| 1,573,890 | Woodward et al. | Feb. 23, 1926 |
| 1,579,024 | O'Grady | Mar. 30, 1926 |
| 1,607,593 | O'Grady | Nov. 16, 1926 |
| 1,623,435 | O'Grady | Apr. 5, 1927 |
| 1,709,341 | DuPont | Apr. 16, 1929 |
| 1,754,323 | Killick | Apr. 15, 1930 |
| 1,757,852 | Alstrup et al. | May 6, 1930 |
| 1,768,812 | Whiting | July 1, 1930 |
| 1,794,727 | O'Grady | Mar. 3, 1931 |
| 1,814,672 | DuPont | July 14, 1931 |
| 2,030,447 | Gretener | Feb. 11, 1936 |
| 2,061,016 | Walton | Nov. 17, 1936 |
| 2,156,814 | Killman et al. | May 2, 1939 |
| 2,337,736 | Cawein | Dec. 28, 1943 |

FOREIGN PATENTS

| Number | Country | Date |
|---|---|---|
| 220,992 | Great Britain | Aug. 29, 1924 |